July 12, 1927.

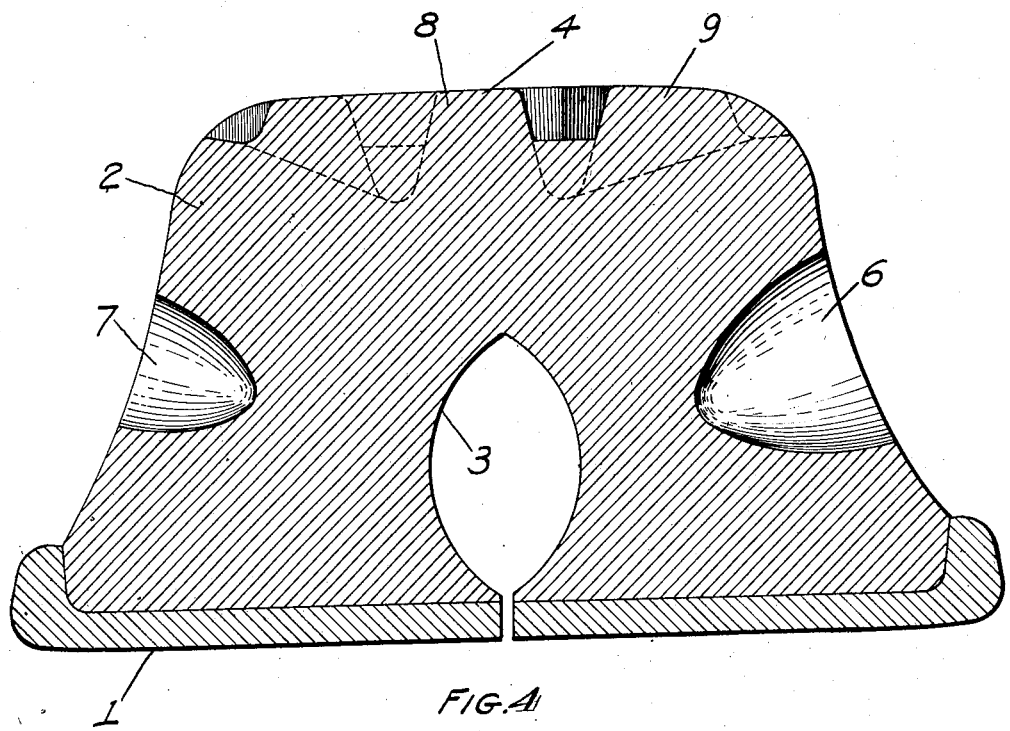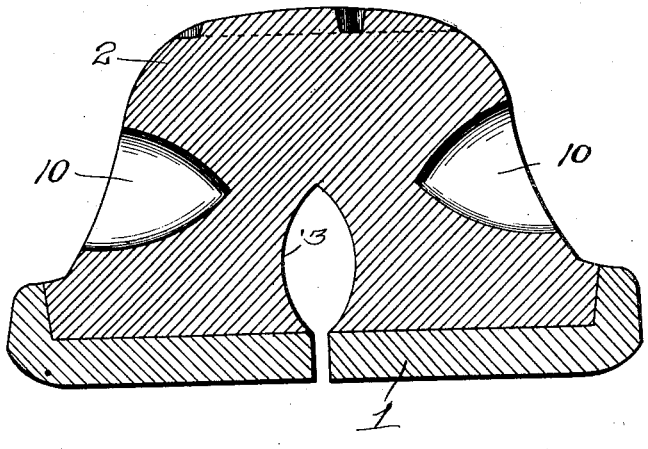

W. E. SHIVELY 1,635,194

CUSHION TIRE

Original Filed Nov. 8, 1923    3 Sheets-Sheet 3

INVENTOR
WALTER E. SHIVELY
BY
ATTORNEY

Patented July 12, 1927.

1,635,194

UNITED STATES PATENT OFFICE.

WALTER E. SHIVELY, OF AKRON, OHIO, ASSIGNOR TO THE GOODYEAR TIRE & RUBBER COMPANY, OF AKRON, OHIO, A CORPORATION OF OHIO.

CUSHION TIRE.

Application filed November 8, 1923, Serial No. 673,508. Renewed January 25, 1927.

My invention relates to cushion tires and particularly to rubber tires comprising a cushion body of rubber that is vulcanized to a metal base band and that has an annular internal chamber.

Cushion tires of this general class have long been constructed with an internal circumferential chamber and with a substantially flat unitary tread surface. The wear to which such tires are subjected indicates that the shoulders or edge portions of the tread are more rigid and non-yielding to road impact than the portions of the tread located directly over the internal chamber and also, that the cushion body could be improved if more uniform distribution of heat could be obtained during vulcanization of the tire.

The object of this invention is to provide means for more uniformly distributing the heat to the tire during vulcanization, providing a tire with improved facilities for dissipating heat generated during operation, and to so arrange recesses in the side walls of the tire as to obtain uniform yielding of all parts of the tread to road impact.

In general this invention contemplates the formation of a plurality of recesses that extend laterally inwardly from the side walls of the tire, but that do not penetrate to the internal cavity of the tire. One of the functions of such recesses is to permit the edge portions of the tire to more readily flex under road impact and to thereby provide a tread surface that is uniformly yieldable over every portion. It is well known that rubber is substantially incompressible and, when the tread surface of the tire is distorted, the rubber must flow back into the side walls of the tire or be absorbed by the yielding of the lateral recesses herein provided or by an intermediate flow of rubber into these recesses rather than through the thickening of the entire side wall.

Fig. 1 of the accompanying drawings is a top plan view of a portion of the tread face of a cushion tire constructed in accordance with this invention;

Fig. 2 is a lateral sectional view taken on line II—II of Fig. 1, looking in the direction of the arrow;

Fig. 4 is a cross-section of the tire shown in Fig. 3.

Figure 1:
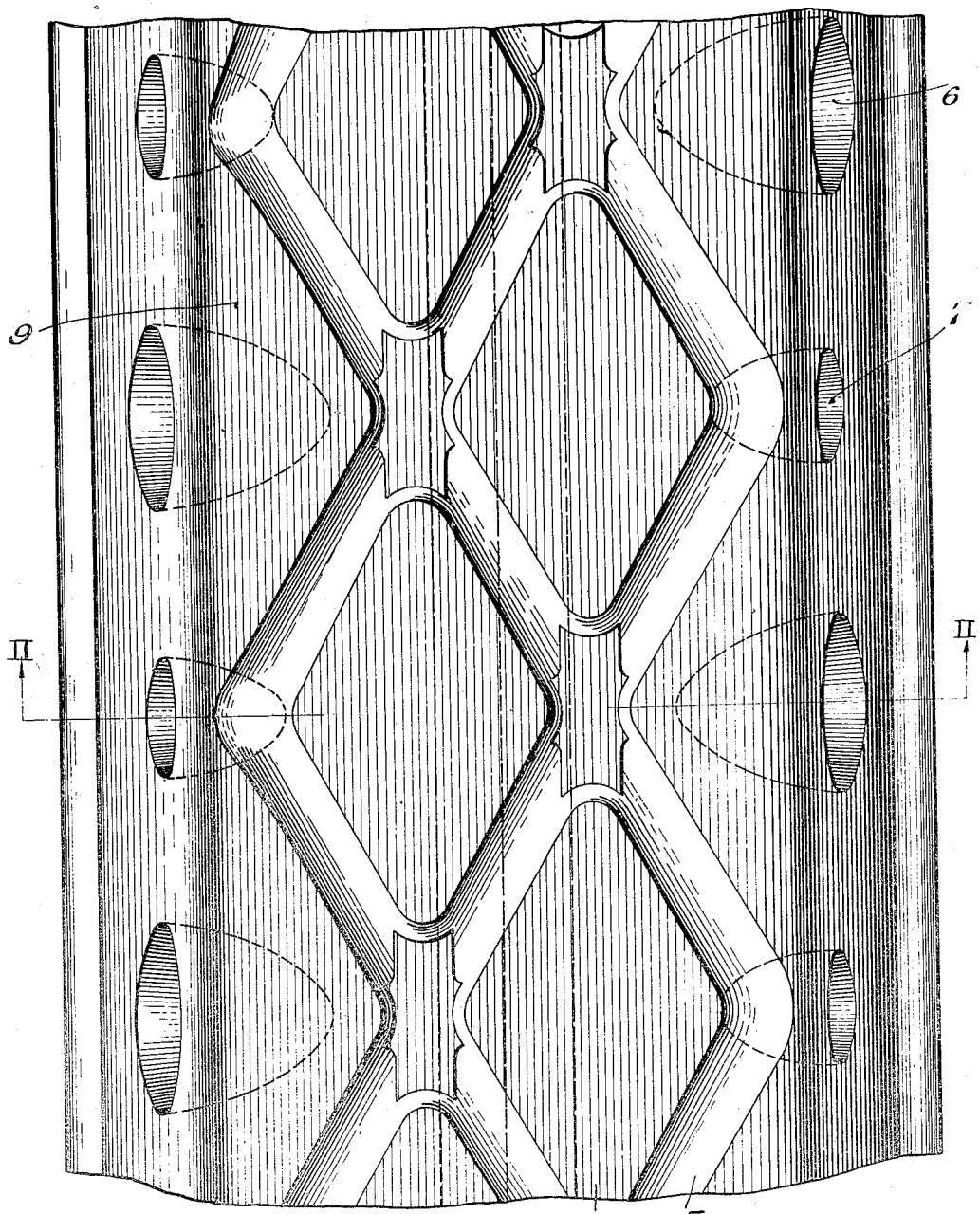

Referring particularly to Figs. 1 and 2 of the drawing the cushion tire of the form illustrated comprises a metal base band 1, that is constructed in accordance with conventional practice, and a rubber cushion body 2 having an internal chamber 3 that extends circumferentially around the tire. A non-skid tread surface 4 is formed by a plurality of intersecting grooves 5 molded into the tread surface of the tire.

This invention consists in forming a plurality of laterally extending recesses 6 and 7 in the side wall of the tire.

The tread portion 4 of the tire is substantially unitary and comprises a series of diamond shaped tread projections 8 and a series of half diamond projections 9 that merge with the side wall of the tire and flank the series of complete diamond figures. By the use of the term "unitary tread surface", I desire to convey the idea of a tread face that is not circumferentially divided into a number of separated tread portions.

In Figs. 1 and 2, the recesses 6 are shown as directly underlying the half diamond figures of the tread. The purpose of this is to reduce the rigidity of the tread at the point where it is most rigid in tires of the type under construction. The distribution of these cavities can be controlled to a large degree by the configuration of the tread and by the thickness of rubber on all sides of the cavity since, in order to get more uniform flow of heat to the material of the tire during vulcanization, it is desirable to have a maximum area of heat conducting metal surface exposed to the rubber in the vicinity of the thickest portions of the tire in order to obtain more uniform vulcanization. By positioning the recesses 6 directly beneath the half diamond tread portions at the edge of the tread, the recesses not only serve to more effectively distribute heat to the rubber of the tire during vulcanization, but they also materially improve the deflecting qualities of the overlying tread portion. The smaller size recesses 7 are positioned under less rigid portions of the tread and serve principally to provide the previously discussed more even distribution of the heat to the tire body.

Figure 3:
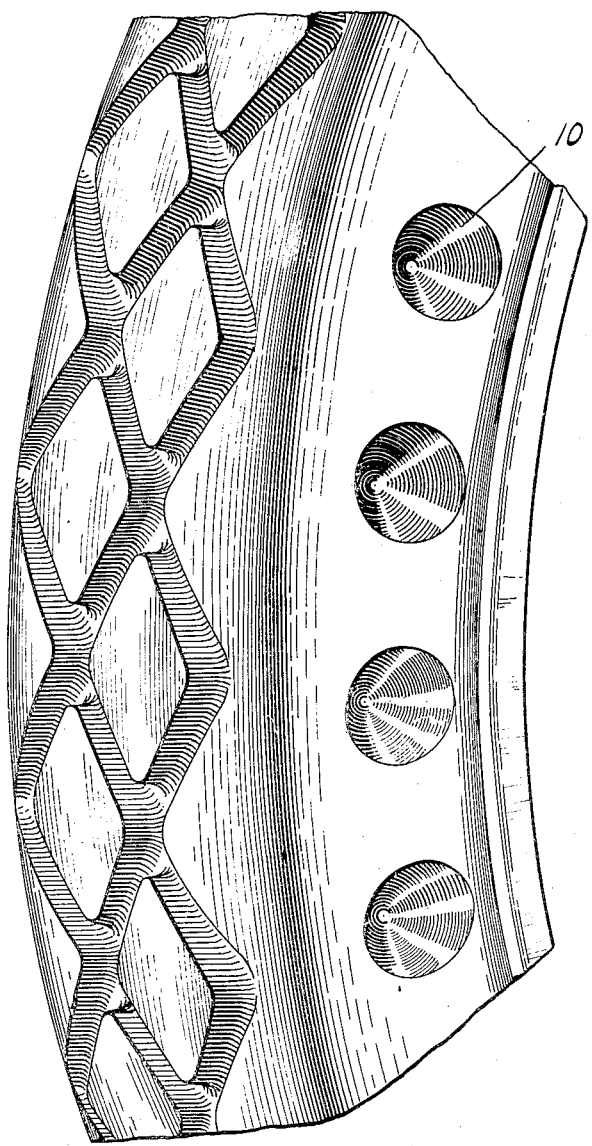
Fig. 3 is a view in perspective of a portion of a modified form of cushion tire constructed in accordance with this invention.

The modification of this invention shown in Fig. 3 illustrates an application of this invention to a tire without particular regard for the configuration of the non-skid tread projections. In this form of tire a series of recesses 10 of uniform size and depth are formed in the side wall of the tire. In all instances, it is important that these recesses do not penetrate the internal cavity of the tire.

It will be apparent to those skilled in the art that this invention is capable of many modifications and I desire therefore that only such limitations shall be imposed as are indicated in the spirit and scope of the appended claims.

What I claim is:

1. A cushion tire comprising a metal base band, and a cushion body vulcanized thereto having a continuous annular internal chamber, a substantially flat tread portion and divergent side walls each having a plurality of recesses extending substantially half way through the side walls.

2. A cushion tire comprising a metal base band, and a cushion body vulcanized to said base band and having a continuous annular internal chamber, said body also having a substantially flat unitary tread surface and a series of substantially semi-spherical recesses formed in the side walls intermediate the tread surface and the base band.

3. A cushion tire comprising a metal base band, and a cushion body vulcanized to said base band and having a continuous, annular internal chamber and a substantially flat unitary tread surface supported from the base band by divergent side walls, each of the side walls having a plurality of recesses extending laterally inwardly less than the thickness of the side wall.

4. A cushion tire comprising a metal base band, and a cushion body vulcanized thereto having an internal annular chamber extending circumferentially thereof and a tread surface composed of non-skid diamond and half-diamond figures, the side walls of said cushion body being substantially weakened by a plurality of lateral recesses positioned directly beneath the half-diamond tread figures.

5. A cushion tire comprising a metal base band, and a cushion body vulcanized thereto having a continuous annular internal chamber, a substantially flat unitary tread surface having non-skid projections formed by a series of oblique intersecting indentures, and lateral recesses in the sides of the tire positioned intermediate the ends of adjacent intersecting grooves.

6. A cushion tire comprising a metal base band, and a cushion body vulcanized thereto having a non-skid unitary tread surface of diamond shaped projections formed by a series of intersecting indentures, and a series of lateral recesses extending inwardly from the side wall of the tire and positioned with their axis in the lateral median plane intersecting the points of one of the tread figures, the depth of said indentures being directly proportional to the distance of the nearest diamond tread button from the side of the tire.

In witness whereof, I have hereunto signed my name.

WALTER E. SHIVELY.